Feb. 7, 1933.    R. J. BARTHOLOMEW    1,896,506
STARTING PULLEY
Filed Jan. 3, 1931
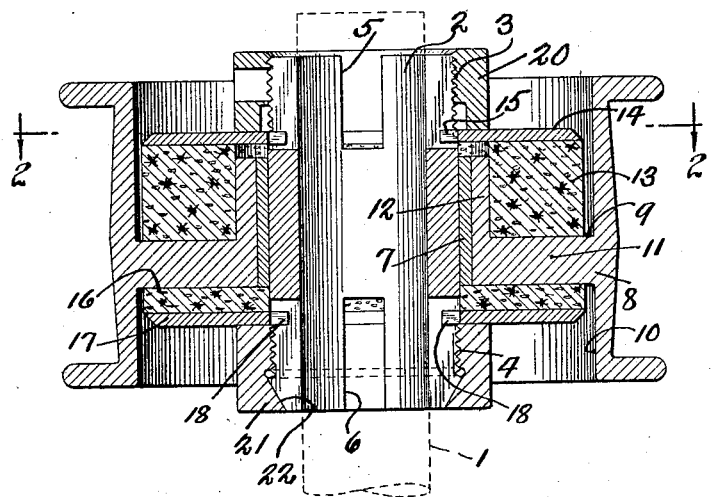
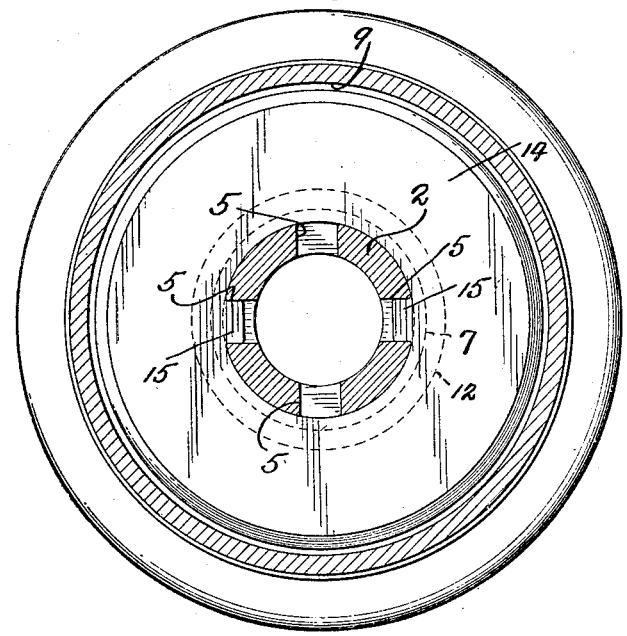
INVENTOR.
Robert J. Bartholomew
BY
Kiddle, Margeson and Hornidge
ATTORNEYS.

Patented Feb. 7, 1933

1,896,506

UNITED STATES PATENT OFFICE

ROBERT J. BARTHOLOMEW, OF GERMANTOWN, PENNSYLVANIA, ASSIGNOR TO FLETCHER WORKS, INCORPORATED, OF PHILADELPHIA, PENNSYLVANIA, A CORPORATION OF PENNSYLVANIA

STARTING PULLEY

Application filed January 3, 1931. Serial No. 506,482.

This invention relates to an improvement in starting pulleys and is particularly well adapted for use in connection with motor driven spinners.

One of the objects of my invention is the provision of a starting pulley which is so constructed and arranged that when used in connection with a machine the rate of acceleration of the machine from a condition of rest to full operating speed is under control, thereby providing for regulating at will the time elapsing between a condition of rest and synchronism with a source of power.

My improved pulley also provides for preventing motor overload thereby eliminating blowing out of fuses or motor destruction.

A still further object of my invention is the provision of a pulley which is simple in construction, inexpensive to manufacture and maintain and quickly and easily adjusted for the purpose of its function.

In the drawing accompanying this application:

Fig. 1 is a cross section of an assembled pulley embodying my invention; and

Fig. 2 is a section on the line 2—2 of Fig. 1.

Referring to the drawing in detail, 1 designates the driven shaft of a spinning machine, for example, this shaft carrying one of the pulleys for the spindle belt of the spinner as will be understood. On the shaft 1 is mounted a sleeve 2, this sleeve being threaded at both ends as seen at 3 and 4, the threads being of equal diameter and lead. This sleeve is provided at each end with cross slots 5 and 6.

Surrounding the sleeve 2 and intermediate its ends is a bushing 7 and immediately surrounding this bushing is the main portion 8 of the pulley. It will be observed that the pulley is provided with an annular groove 9 and annular groove 10 in its upper and lower faces, respectively. The bottoms of these grooves are spaced to provide a web 11.

Received by the upper groove 9 and surrounding the flange 12 of the pulley is a friction ring 13 which may be made of cork, for instance, and over this ring is a friction disc 14 of metal provided with keys 15 projecting into the slots 5 in the upper end of the sleeve 2.

The groove 10 is provided with a similar friction ring 16 and overlying this ring is a friction disc 17 similar to the friction disc 14 provided with keys 18 which enter the slots 6 in the lower part of the sleeve 2. The friction ring 16 it is to be noted is of less thickness than the friction ring 13.

Threaded upon the upper end of the sleeve 2 is an adjusting nut 20 and threaded upon the lower end of the sleeve is a clamping nut 21. It is to be noted that the outer end of the nut 21 is provided with a tapered bore as shown at 22, the lower end of the sleeve 2 being correspondingly tapered.

The radial cross slots 5 in the upper end of the sleeve 2, as above mentioned, receive the driving keys 15 on the disc 14, while the radial cross slots 6 in the lower end of the sleeve receive the keys 18 of the disc 17. These slots also permit of limited collapse of the sleeve 2 under the radial pressure exerted by the tapered inside surface of the clamping nut 21, thus permitting secure and concentric engagement between the shaft 1 and the sleeve.

On the lower end of the sleeve 2, as viewed in the drawing, it will be noted that four slots are provided which insure four points of engagement of the sleeve with the shaft when the sleeve is collapsed. The slots are of sufficient length to permit of ample axial movement of the clamping nut 21 so that the latter will function before the keys 18 abut the inner ends of the slots 19. Likewise it is to be understood that the slots at the upper end of the sleeve are of a sufficient length or depth to provide clearance between their inner ends and the keys of the friction disc 14 which is ample for adjustment over the required range and for taking up wear on the friction rings.

It is to be noted that the friction ring 16 is not only thinner but may be less resilient than the ring 13, and that the rings are not centrally located with respect to the center line of the pulley, the ring 16 being positioned on the side of the pulley web farthest away from the adjusting nut 20. By this arrangement minimum axial displacement of the plane of rotation of the pulley is caused when making a pressure adjustment between the friction surfaces.

It has been found in practice that the starting of certain machines employed in the textile industry, such as winding, spinning, twisting machines and the like, should be gradual and not dependent upon the skill and judgment of the operators. Such machines are generally driven by individual electric motors through long belts, often forty feet in length, which may drive the spindles at an ultimate speed of 16000 revolutions a minute. If such machines are started abruptly great variations in the time at which all spindles have arrived at synchronism occurs, the slower running feed mechanism operating at its operating speed before any of them. As a consequence there is a great variation in the twist of the yarns at substantially every spindle of the machine until all spindles have arrived at full operating speed. By applying a pulley of the character above described to the drive shaft 1 which as above explained carries one of the pulleys for the spindle belt acceleration may be varied at will by simply adjusting the friction of the pulley on the shaft so as to insure proper speed of all of the spindles at all times, i. e., from a position of rest up to full speed.

What I claim is:—

1. A starting pulley comprising in combination an outer member, a central sleeve, said sleeve being threaded at each end, said outer member being provided with upper and lower annular grooves, a friction ring in each groove, a friction disc in each groove overlying said rings, said sleeve being slotted axially, keys on said discs entering said slots, and a member threaded on each end of said sleeve, for controlling the pressure of said discs on said rings and for contracting the sleeve to effect rotation thereof with a supporting shaft.

2. A starting pulley comprising in combination an outer member, an inner concentric sleeve adapted to receive a supporting shaft, friction rings carried by said outer member and surrounding said sleeve, said rings being of different thicknesses, a friction disc engaging each ring and having a driving connection to said sleeve, and an adjusting nut threaded on the end of said sleeve remote from the thinner of said friction rings.

3. A starting pulley comprising in combination an outer member, an inner concentric sleeve adapted to receive a supporting shaft, a friction ring unattached to but engaging said outer member, a cooperating disc having a driving connection with said sleeve, a nut having a tapered bore threaded upon one end of said sleeve to contract the sleeve thereby frictionally to connect the sleeve to its supporting shaft without disturbing the driving connection between the friction disc and sleeve, and a nut threaded on the other end of said sleeve for varying the pressure of said disc on said friction ring thereby varying the pressure of the friction ring against said outer member.

This specification signed this 27 day of December, 1930.

ROBERT J. BARTHOLOMEW.